United States Patent [19]
Aspinwall et al.

[11] 3,814,251
[45] June 4, 1974

[54] POWER TRANSMISSION

[75] Inventors: Ronald A. Aspinwall, Detroit; MacKellar K. Graham, Birmingham, both of Mich.

[73] Assignee: Sperry Rand Corporation, Troy, Mich.

[22] Filed: Aug. 9, 1972

[21] Appl. No.: 279,123

[52] U.S. Cl. .................................. 210/90, 210/133
[51] Int. Cl. ............................................. B01d 35/14
[58] Field of Search ............................. 210/90, 133

[56] References Cited
UNITED STATES PATENTS
2,983,336  5/1961  Kolbe .......................... 210/133 X
2,998,138  8/1961  Mould et al. .................... 210/90

*Primary Examiner*—Frank A. Spear, Jr.
*Attorney, Agent, or Firm*—Theodore Van Meter

[57] ABSTRACT

A fluid filter has a body with a central cavity open at the bottom to receive a cup containing a cylindrical filter cartridge and having inlet and outlet terminals, one of which opens to the cavity and the other opens to the interior of a fluid directing member opening at its bottom to the interior of the filter cartridge. A normally closed bypass valve is mounted in one wall of the fluid directing member and actuates a rotary indicator mounted on the top of the body. The indicator shaft is sealed against fluid pressure inside the body. The body is preferably a machined casting and the flow directing member preferably is formed from sheet metal.

1 Claim, 4 Drawing Figures

PATENTED JUN 4 1974

POWER TRANSMISSION

Fluid filter units of the self-contained type such as are used for connecting into the plumbing lines of hydraulic power systems as heretofore constructed, have involved rather complex castings with intricately shaped cored passages and complex machining to accommodate a filter element, a bypass valve and, frequently, a bypass valve indicator. These have resulted in high production costs and frequently in undesirable flow restrictions.

It is an object of the present invention to provide an improved fluid filter construction which avoids the use of intricate cored passages or complex machining and which is provided with open passages for fluid flow and is economical to manufacture.

This is accomplished by the use of a body having a cavity open at the bottom and having inlet and outlet connection terminals communicating with the cavity, a closure member removably mounted on the body to close the open bottom of the cavity, a flow directing unit secured to the top of the cavity and in sealed communication with one of the terminals and having walls separating the terminals, a first opening in the wall facing downwardly, means surrounding the first opening to sealingly engage the end of a cylindrical filter cartridge, a filter cartridge removably retained between the last named means and the closure member, a second opening in the walls, and a normally closed bypass valve mounted in the second opening.

IN THE DRAWING

Figure 1:
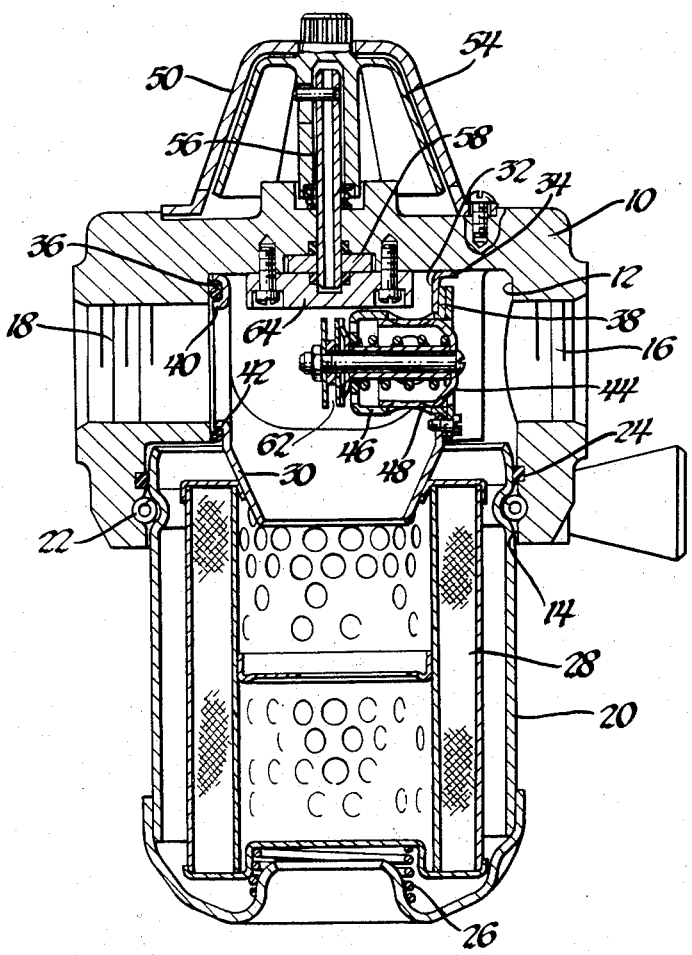
FIG. 1 is a cross-sectional view taken on line 1—1 of FIG. 3 of a filter incorporating a preferred form of the present invention.

In the configuration illustrated in the drawings, the filter comprises a main body member 10 in the form of a machined casting having a central cavity 12 with a circular bottom opening 14. An inlet terminal 16 and an outlet terminal 18 extend laterally from the cavity 12. A closure member in the form of a cup 20 is mounted in the opening 14 and is retained therein by means of a locking spring 22 (see FIG. 3) which is inserted into grooves in the body and the cup respectively. A sealing ring 24 engages the upper end of the cup 20. A spring 26 urges the cylindrical filter element 28 upwardly into engagement with the conical lower end 30 of a fluid directing unit 32.

Figure 2:
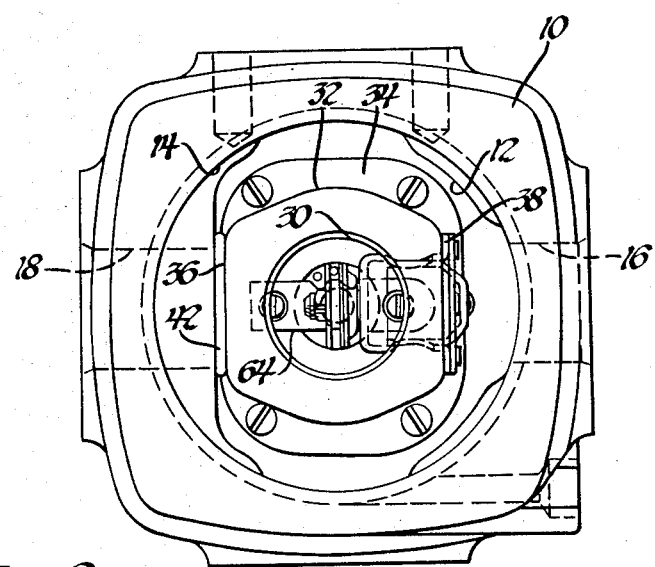
FIG. 2 is a bottom view of the body of the filter illustrated in FIG. 1.

The fluid directing unit 32 is preferably formed as a stamping with a flange 34 at its upper end, which is screwed to the top surface of the cavity 12, as shown in FIG. 2. The tubular section of the unit 32 has flat side walls 36 and 38 connecting the flange 34 and the conical lower end 30. The side wall 36 has a protruding circular flare 40 which abuts the outlet opening 18 and is sealed thereto by an O-ring 42. Mounted in the opposite side wall 38 is a spring-loaded bypass valve 44 which slides within a cup 46 secured to the side wall 38. Valve 44 normally closes one or more openings 48 in the side walls of the cup 46 and opens only in response to a predetermined pressure difference between the inlet 16 and the outlet 18.

Figure 3:
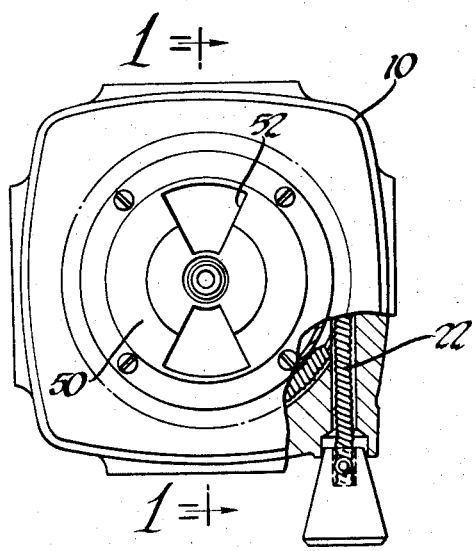
FIG. 3 is a top view, partially in section, of the filter of FIG. 1.
Figure 4:
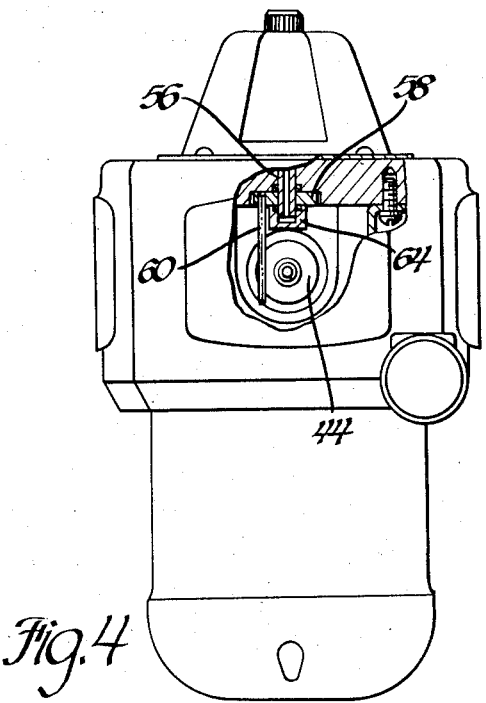
FIG. 4 is a side view, partly in section, of the filter in FIG. 1.

Mounted on top of the body 10 is an indicator housing 50 having a pair of windows 52 (FIG. 3). A rotary indicator has wings 54 mounted on a vertical shaft 56 which is journaled in the top of the body 10. The wings 54 are normally concealed, but may be rotated to be exposed through the windows 52. An actuating disc 58 is secured to the lower end of indicator shaft 56 and has a downwardly extending pin 60 (FIG. 4) which is received in the groove 62 formed by a pair of discs on the valve 44. The lower end of the indicator shaft 56 is sealed against the pressure within the body by means of an elongated cap member 64 secured to the top surface of the cavity 12.

With the unit connected into the plumbing of a fluid power system, fluid entering the inlet terminal 16 flows into the cavity 12, around the sides of the fluid directing unit 32 and downwardly into the closure cup 20 where it passes through the porous walls of the filter cartridge 28 thence upwardly into the interior of the fluid directing unit 32 and outwardly through the outlet terminal 18. Thus all fluid going through the unit is filtered by the cartridge 28.

As the flow resistance through the cartridge 28 gradually increases, due to the accumulation of contaminants, the pressure drop across the cartridge will increase and when it reaches a point sufficiently high to open the bypass valve 44, the latter will then allow fluid to pass directly from the inlet to the outlet. The motion of the valve 44 is transmitted via the groove 62 and the pin 60 to the rotary indicator, thus displaying a signal visible from outside the unit calling attention to the need for changing the cartridge.

This is easily performed after any pressure in the system is relieved by removing the retaining spring 22 and dropping the cup 20. Fluid pressure in the system normally locks the retaining spring 22 in position against accidental removal since this produces a very substantial force, urging the closure cup 20 downwardly against the retaining spring 22. Fluid pressure within the filter is prevented from binding the indicator shaft 56 by the sealing member 64. Thus, the indicator does not impose more than a minimal force upon the bypass valve 44, which remains free to act in its intended manner. The use of the terms "top" and "bottom" in the foregoing specification and the appended claims is intended to indicate only two opposite directions rather than orientation in reference to gravity.

We claim:

1. A fluid filter comprising a body having a cavity open at the bottom and having inlet and outlet connection terminals communicating with the cavity, a closure member removably mounted in the body to close the open bottom of the cavity, a flow directing unit secured to the top of the cavity and in sealed communication with one of the terminals and having walls separating the terminals, a first opening in the walls facing downwardly, means surrounding the first opening to sealingly engage the end of a cylindrical filter cartridge, a filter cartridge removably retained between the last-named means and the closure member, a second opening in the walls, a normally closed bypass valve mounted in the second opening, an indicator on top of the body and having a connection with the bypass valve for indicating the opening action of the valve, the connection between the indicator and the valve comprising a rotary shaft, and means in the cavity sealing the end of the shaft against fluid pressure in the cavity.

* * * * *